US011571008B2

(12) United States Patent
Siegel et al.

(10) Patent No.: US 11,571,008 B2
(45) Date of Patent: Feb. 7, 2023

(54) METHODS AND SYSTEMS FOR AN INTELLIGENT BEVERAGE MIXING APPLIANCE

(71) Applicant: BEV-EDGE, LLC, Ridgefield, CT (US)

(72) Inventors: Thomas G. Siegel, Ridgefield, CT (US); Todd H. Becker, Ridgefield, CT (US)

(73) Assignee: Bev-Edge, LLC, Ridgefield, CT (US)

( * ) Notice: Subject to any disclaimer, the term of this patent is extended or adjusted under 35 U.S.C. 154(b) by 83 days.

(21) Appl. No.: 17/062,727

(22) Filed: Oct. 5, 2020

(65) Prior Publication Data

US 2021/0259286 A1    Aug. 26, 2021

Related U.S. Application Data

(63) Continuation of application No. 15/566,945, filed as application No. PCT/US2016/043603 on Jul. 22, 2016, now Pat. No. 10,791,752.

(60) Provisional application No. 62/195,755, filed on Jul. 22, 2015, provisional application No. 62/195,751, filed on Jul. 22, 2015.

(51) Int. Cl.
| | |
|---|---|
| *A47J 31/40* | (2006.01) |
| *A23L 2/52* | (2006.01) |
| *A23L 2/54* | (2006.01) |
| *A23L 2/60* | (2006.01) |
| *B67D 1/00* | (2006.01) |

(52) U.S. Cl.
CPC ............... *A23L 2/54* (2013.01); *A23L 2/60* (2013.01); *A47J 31/40* (2013.01); *B67D 1/0057* (2013.01)

(58) Field of Classification Search
CPC ...................... A47J 31/40–41; A23L 2/52–68
See application file for complete search history.

(56) References Cited

U.S. PATENT DOCUMENTS

| | | |
|---|---|---|
| 5,207,784 A | 5/1993 | Schwartzendruber |
| 6,003,318 A | 12/1999 | Busick et al. |
| 6,669,051 B1 | 12/2003 | Phallen et al. |
| 2009/0159612 A1 | 6/2009 | Beavis et al. |
| 2009/0295659 A1 | 12/2009 | Blumberg, Jr. |
| 2010/0251901 A1 | 10/2010 | Santoiemmo |
| 2012/0156337 A1 | 6/2012 | Studor et al. |
| 2013/0062366 A1 | 3/2013 | Tansey |
| 2013/0106690 A1 | 5/2013 | Lim |
| 2013/0325173 A1 | 12/2013 | Crisp, III |
| 2014/0065266 A1 | 3/2014 | Shalev |
| 2014/0150669 A1 | 6/2014 | Green et al. |
| 2014/0363548 A1 | 12/2014 | Njaastad et al. |

(Continued)

OTHER PUBLICATIONS

Bonne O, "The Science of Carbonation: A Visual Guide to Great Carbonation"; 2020, 9 pages.

(Continued)

*Primary Examiner* — Michael A Laflame, Jr.
(74) *Attorney, Agent, or Firm* — Mallory M. Henninger; Advent, LLP

(57) ABSTRACT

Provided herein are methods and systems for a networked soda reconstruction appliance, adapted for home or office use, that includes intelligent sur systems or handling various beverage components, which can be mixed under intelligent control, including local control and control by a remote host system, which may help manage the appliance itself as well as the replenishment supply chains involved in delivering appropriate beverage components to the appliance.

19 Claims, 9 Drawing Sheets

(56) References Cited

U.S. PATENT DOCUMENTS

2016/0222332 A1   8/2016   Peirsman et al.
2016/0255991 A1   9/2016   Givens, Jr. et al.

OTHER PUBLICATIONS

Cornelius Service Training Series, Basic Post-Mix Beverage Unit; Feb. 1, 2006, 60 pages.
Notification of Transmittal of the International Search Report and The Written Opinion of the International Searching Authority dated Nov. 4, 2016.

METHODS AND SYSTEMS FOR AN INTELLIGENT BEVERAGE MIXING APPLIANCE

CROSS-REFERENCE TO RELATED APPLICATIONS

This application is a continuation under 35 U.S.C. § 120 of U.S. patent application Ser. No. 15/566,945, filed Oct. 16, 2017, and titled "METHODS AND SYSTEMS FOR AN INTELLIGENT BEVERAGE MIXING APPLIANCE," which in turn claims the benefit of U.S. Provisional Application No. 62/195,755 filed on Jul. 22, 2015 and U.S. Provisional Application No. 62/195,751 filed on Jul. 22, 2015, where the entire content of each is hereby incorporated by reference.

TECHNICAL FIELD

This disclosure relates to the field of beverage delivery systems, and more particularly to an intelligent beverage mixing and delivery appliance.

BACKGROUND

Technologies have been developed for mixing and delivering soda ingredients, such as systems used in manufacturing and bottling facilities of major soda companies, and systems used in commercial restaurants. Some home mixing systems also exist. However, many challenges continue to exist for beverage companies, beverage consumers, and other parties who are involved in supplying and delivering beverages, and related components in the beverage market. In particular, there are challenges in delivering beverages that are of high (e.g., "trademark"-worthy) quality, that satisfy individualized consumer taste preferences, that are delivered at the correct temperature, with the correct level of carbonation (or without carbonation), and with the correct ratios of components, that can be stored well while maintaining quality, that are available when needed, and that can be delivered safely and efficiently to consumers, not only in restaurants, but in other environments where consumption occurs at lower rates, such as in homes and offices.

SUMMARY

Provided herein are methods and systems for a soda mixing appliance, in some cases referred to as a beverage reconstruction appliance, adapted for home or office use, that includes intelligent sub-systems for handling various beverage components, which can be mixed under intelligent control, including local control and in some embodiments provided with networking capabilities for control by a remote host system, which may help manage the appliance itself as well as the replenishment supply chains involved in delivering appropriate beverage components to the appliance. Among other benefits, the methods and systems accordingly may provide an appliance that allows providers to deliver beverages that are of very high quality, that allow user-customization and otherwise satisfy individualized consumer taste preferences, that deliver beverages at the correct temperature, that store ingredients reliably and efficiently and in a way that ensures they are available when needed, that achieves high levels of carbonation for appropriate beverages, and that delivers beverages and their components safely and efficiently. While many of the embodiments disclosed herein involve carbonated beverages, such as soda, other beverages such as teas, juices, and the like can be provided, with or without carbonation.

A networked appliance for mixing and delivery of a carbonated beverage to a user may include a communications facility for connecting the appliance to a remote host system, a sweetener cooling system for containing at least one type of liquid form sweetener, a gas handling system for accepting $CO_2$ cartridges, a flavor handling system, and a water system, where at least one of the sweetener cooling system, the gas handling system, the flavor handling system, and the water system includes at least one sensor adapted to deliver sensed information via the communications facility to the remote host.

Implementations may include one or more of the following features. The gas handling system may be adapted to accept $CO_2$ cartridges that are sized below one hundred grams. At least one sensor may sense a remaining level of at least one of a sweetener, a flavor, and a gas. At least one sensor may sense a low pressure condition of gas of a cartridge of a gas handling system. At least one sensor may sense a low liquid condition of a flavor unit of the flavoring system. At least one sensor may sense an indicator of tampering. At least one sensor may sense an indicator of the absence of tampering. At least one sensor may sense a liquid level in at least one of the sweetener cooling system and the flavor handling system. The appliance may further include disposing the flavor handling system in proximity to the cooling system to facilitate cooling of the flavoring. The appliance may further include an ice making system. The appliance may further include a user interface by which a user may specify at least one of a desired flavor, a desired level of sweetness, a desired temperature, and a desired type of sweetener. The appliance may further include a mixing system for mixing sweetener, flavor, gas, and water to produce a beverage. The mixing system may use at least one sensor to sense at least one of a level, a flow, a pressure, and a temperature of at least one ingredient. The appliance is adapted to use user-supplied ice to pre-chill at least one of water, syrup, and sweetener and subsequently adds the ice to a beverage. The flavoring system may include at least one of a pod and a cartridge system. The flavoring system may include a volumetric syrup delivery system that is not dependent on viscosity. The appliance may be adapted to handle multiple serving flavoring units or single serving flavoring units. The appliance may generate an ice bank to provide capacitive cooling capability for at least one of a flavoring, a syrup, and water for a beverage. The ice bank may be generated using at least one of a thermoelectric cooling facility and a vapor compression cooling facility.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. The accompanying figures where like reference numerals refer to identical or functionally similar elements throughout the separate views and which together with the detailed description below are incorporated in and form part of the specification, serve to further illustrate various embodiments and to explain various principles and advantages all in accordance with the systems and methods disclosed herein.

Figure 1:
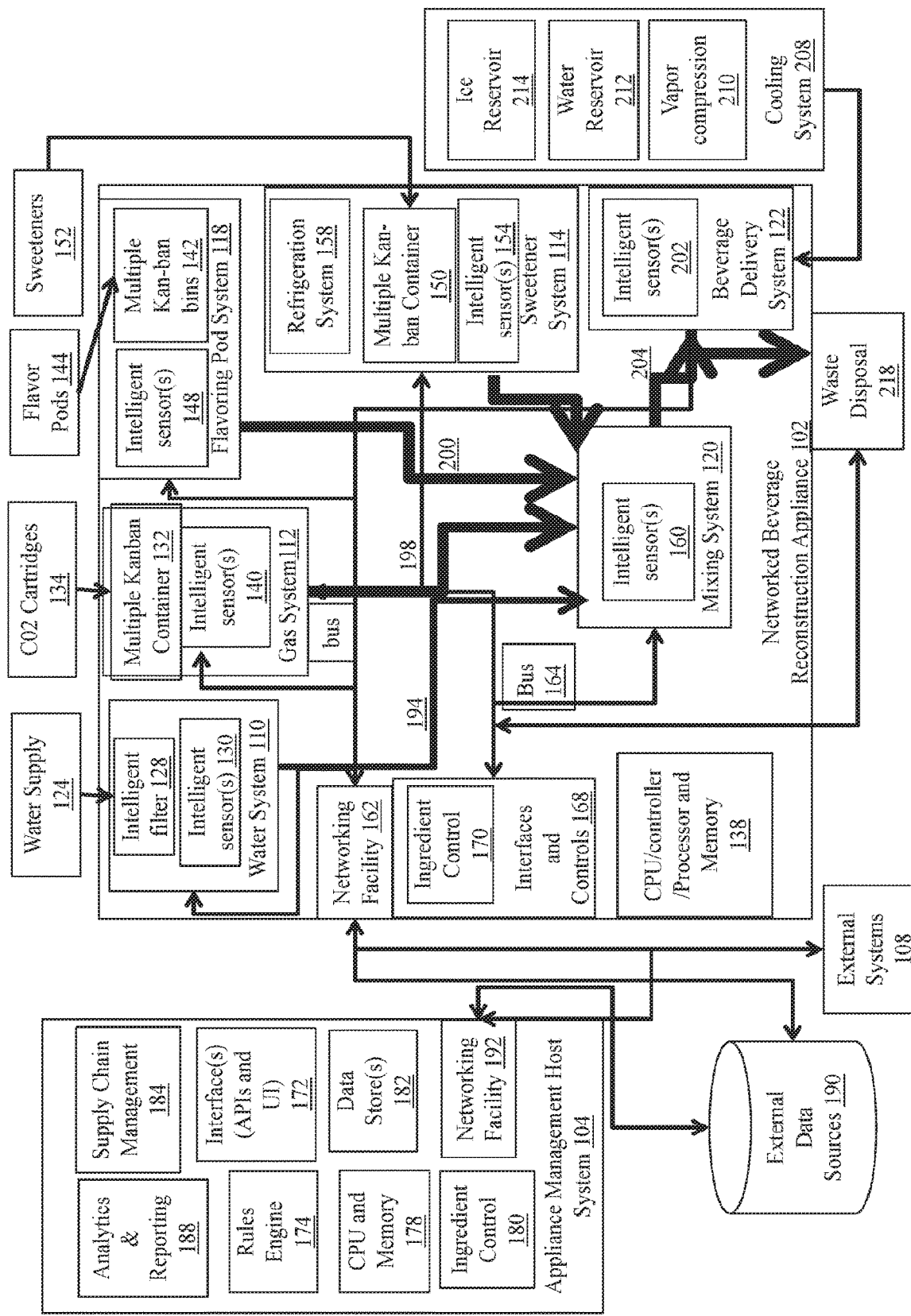
FIG. 1 illustrates a block diagram of various components of a beverage mixing appliance, including a networked appliance, a remote host for managing the appliance and certain external systems with which the appliance and the remote host may interact.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the systems and methods disclosed herein.

DETAILED DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose, Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

Before describing in detail embodiments that are in accordance with the systems and methods disclosed herein, it should be observed that embodiments include combinations of method steps and/or system components. Accordingly, the system components and method steps have been represented where appropriate by conventional symbols in the drawings, showing only those specific details that are pertinent to understanding the embodiments of the systems and methods disclosed herein so as not to obscure the disclosure with details that will be readily apparent to those of ordinary skill in the art having the benefit of the description herein.

In the beverage industry, the transportation of beverages has generally settled at an irrational equilibrium, both economically and environmentally. Typical carbonated soft drinks are about 83% water, while juices are about 80-90% water. The distribution of these products in the art may be inefficient, e.g.: packaging for the finished beverage vs. just the concentrate; shipping costs associated with the weight and volume of the finished beverage; and the impact to the consumer of transporting and carrying finished beverages.

Shipping concentrated product may thus involve leaving the water out during packaging and adding at the point of serving. However, this generally has not happened in the art because of several reasons. For example, beverage companies (BevCos) should control their brand integrity, where the simplest solution is to bottle the finished product, virtually guaranteeing the integrity of the beverage every time (within the limitations of current packaging solutions). Also, for example, the food service dispensed solutions have generally been ineffective margin channels for BevCos. This may be due to three reasons: (1) the quality of dispensed carbonated soft drinks (CSDs) not living up to that of a chilled can or bottle, so the consumer expectation is less brand specific; (2) the consumer being effectively forced to a single brand if they visit a given restaurant, giving the customer (the restaurant) more power; (3) national restaurant chains having great purchasing power to negotiate deals; and (4) the BevCos, given the perceived lower quality of syrup, may have allowed the customers to commoditize the product, because they have competed on price for so long that they have effectively driven down margins to undesirable levels. Because of this last point, BevCos may be conditioned to avoid dispensed solutions at all cost as the margins are often single digits or worse. Also, for example, CSDs have been on the decline and taking reengineering steps in a low margin channel has not been highly valued.

There are generally four attributes to make a trademark quality CSD: low temperature, high carbonation, proper water to syrup ratio control, and high quality water. The BevCos are generally militant about satisfying these parameters in part because the difficulty in achieving them creates a barrier to competition. Low temperature may be a challenge for carbonated drinks, as $CO_2$ absorption into water increases as temperature decreases. Empirically, a way to achieve trademark quality carbonation is to use water that is less than 40 degrees F., where the colder the water the better. Thus, a challenge for a home beverage dispenser that pours a trademark quality CSI) is how to chill water below 40 degrees F., hold the ratio to 5:1, and provide sufficient carbonation, all at a compelling price point.

An implementation described herein may provide a trademark quality CSD by an appliance suitable for a kitchen counter having a small footprint, low noise, and not taking significant time to cool down and to recover, etc. Thus, an implementation utilizes water that is less than 40 degrees F., whereby it can absorb enough $CO_2$ to hit a carbonation specification.

An implementation described herein may also provide utilizes ice provided from a separate vapor compression cooling system as both a cooling mechanism and an ingredient, e.g., in a crushed format. This meets the preference of a majority of consumers.

An implementation may use ice as a low cost cooling mechanism, as well as an ingredient for the beverage. Using the implementation, a user may utilize three ingredients in preparing the beverage: a pod or pouch including syrup, tap water, and ice from an adjacent ice machine. Additionally the implementation may use a $CO_2$ canister to add the $CO_2$ to the cold water. The user may add the three ingredients listed above into chambers, where the processing steps may be as follows:

A machine as described herein may measure the temperature of the water and ensure a sufficient volume of ice and water. A fixed amount of ice may then be crushed or shaved and dropped into a mix chamber. Given the measured temperature of the water, an appropriate amount of water may be dropped into the mix chamber. The higher the temperature of the water, the more ice that should melt in order to drive the temperature of the water down. The equation $Mc\Delta T$ may be used to calculate the amount of meltage that will be generated once the crushed ice and water are mixed. The $CO_2$ may then be forcibly introduced into the water either in the mix chamber or prior to entering the mix chamber. Once sufficient time has passed to achieve the desired temperature, the ice and now carbonated water mixture may be released to the nozzle, at substantially the same time the syrup is evacuated from the pod/pouch. The ice in the mixture may help to mix the water and syrup, minimizing ratio stratification. Note that the dwell time of the ice and water may be calculated by the amount of heat transfer required, meaning that the colder the input water the quicker the entire process will take. Also the amount of residual ice in the drink may vary depending on the input water temperature.

Another implementation may include an evacuation mechanism of the pod/pouch. The viscosity of syrup can generally vary from very thin (diet sodas) to very thick. Viscosity may increase as temperature decreases; for a sugared soda, the viscosity typically doubles when the syrup temperature goes from 70 to 40 degrees F. Regulating performance based on varied brands and temperatures can be quite expensive and difficult, so a volumetric solution (one that is ambivalent to viscosity) may be preferred. This is described below, e.g., with reference to FIG. 7.

Another feature if an implementation may be applicable to both post mix carbonated soft drinks as well as reconstituted cold drinks which add water, for instance juice from concentrate, iced liquid coffee, frappes and smoothies. One of the systems described herein is essentially a closed system. By having an understanding of the amount of ice, an understanding of the quantity of water, and having sensed the incoming temperature of the water, it may be possible to understand at a point in time the amount of ice melted during the process. With this knowledge, the amount of water and/or syrup can be metered to adjust for the meltage quantity and maintain the 5:1 ratio spec.

The amount of ice to achieve a given temperature is governed by the equation $Q=Mc\Delta T$, where $\Delta T$ signifies the change in temperature required, m is mass, c is specific heat calorie/grain for water), and Q equals heat energy. Time may also be a parameter as the drink will likely be dispensed prior to the system achieving complete temperature equilibrium. The processing steps may be as follows:

The amount of syrup in the pod or pouch may be fixed. e.g. 2 oz. for a 12 oz. finished beverage. A user may add a relatively fixed quantity of ice into the ice chamber. The verification of quantity can be achieved by a strain gauge, a vision sensor, a float switch tied to a finger on the ice reservoir cover, or perhaps the variance in ice placed will be small enough that sensing is not required. Water may be added to the water reservoir. The water temperature in the water reservoir may be measured via a temperature sensor (or otherwise estimated). An on-board algorithm may calculate the amount of water needed so that the finished beverage will have 5 parts (input water plus ice melt water): 1 part syrup. The ice may be added to the mix chamber, likely after moving through an ice crusher (note the ice does not have to be crushed, but cube ice will take longer to chill the water). The proper amount of reservoir water may be added to the mix chamber. The ice (likely crushed) may be allowed to cool the water in the mix chamber for a predetermined tune, or to achieve a predetermined temperature (or some combination of time and temperature). A temp sensor in the mix chamber may be used. The time to dispense will likely be variable depending on the input water temperature. In the event that the input water temperature is too high, it is possible that the dispenser could not allow a dispense action at all. In embodiments, gaseous $CO_2$ may be added to the mix chamber once the proper temperature has been achieved. The then carbonated mixture of water (both reservoir and melt) and ice may be poured into the glass concurrent to the evacuation of the pod. This system may work equally well with an uncarbonated drink, be it concentrated juice, liquid ice coffee, smoothies, frappes, and the like.

FIG. 1 illustrates a block diagram of major components of a networked beverage mixing, or reconstruction, appliance (referred to as the "appliance" interchangeably without limitation throughout this disclosure) 102, a remote appliance management host system (interchangeably referred to as a "host" without limitation throughout this disclosure) 104 for managing the appliance 102 and certain external systems 108 with which the appliance 102 and the remote host may interact 104. In certain optional embodiments, networking capabilities may be omitted and the appliance may operate autonomously, or semi-autonomously using local intelligence, such as processor, memory, and one or more applications adapted to operate one or more of the components locally at the appliance 102.

The beverage mixing appliance 102 may include or may be coupled operatively with several systems and sub-systems such as those illustrated in FIG. 1, optionally including without limitation a water system 110 (optionally including water quality measurement and filtering), a gas system 112, a sweetener system 114, a flavoring system (which may be a pod-based, cartridge based, or other similar or flavoring pod and/or cartridge system 118 having various pod and cartridge designs (including multiple serve and single serve designs) that are collectively referred to herein, except where context indicates otherwise, as "pods"), a mechanism or system for evacuating pod syrup from a pod or otherwise delivering desired amounts and types of syrup, a mixing system 120, which may include a mechanism for accomplishing ratio control among ingredients, including syrup ratio control, a carbonation system, a cooling system 208, one or more data collection systems (e.g., sensors), a beverage delivery system 122 (which may include an output water system, such as a disk-based system, a syringe, a nozzle (including a smart nozzle), or the like), various ingredient storage systems (e.g., Kanban systems), a waste disposal system 218 (including a waste water disposal system) and the like. Methods and systems disclosed herein may include ones related to control system logic for local, remote (including networked), and autonomous control. Control systems may rely on data collection systems (e.g., sensors) for control of sub-systems, optimization of particular systems, and autonomy, such as automatic reaction to changing parameters, such as temperature changes.

Methods and systems disclosed herein may also include ones for arranging "deconstructing") for the appropriate storage and delivery of ingredients in forms that enable efficient storage, effective mixing, and the like, such as separating out syrup, sweeteners, water, carbonation ingredients, and the like into desired form factors for efficient transportation, storage, mixing, and the like.

Methods and systems disclosed herein, including ones for mixing and ratio control, may allow drink customization as may be desired, optionally under remote, local, user, or autonomous control. Customized beverages may be of "trademark" quality (e.g., meeting or exceeding the standards and quality of a trademarked beverage from a particular company, such as trademarked beverages seen commonly in the beverage marketplace), or may allow variants, such as choice of sweetener, amount of sweetener, and the like. Customized beverages may control levels of carbonation from non-carbonated to mildly carbonated (sparkling) to fully carbonated.

The water system 110 may receive water from an external water supply unit 124 for use in the beverage production. In one example, the supplied water may not be suitable for drinking or for high quality beverage purposes. An intelligent filter 128 may be coupled to or included within the water system 110 so as to intelligently filter the supplied water to make it suitable for use for beverage preparation in the next stages. For example, the intelligent filter 128 may be programmed for a set of computer executable instructions to intelligently monitor characteristics of the supplied water and regulate various compositions and characteristics according to defined guidelines that may be stored in a database coupled to the intelligent filter 128 or may be stored in the host system 104 at a remote location. The intelligent filter 128 may provide for shut off of flow of any water that includes any undesirable minerals, harmful bacteria, unwanted deposits, or other components that may impact the quality or taste of the beverage, or that may impact health. The filter 128 may also monitor its own effectiveness, such as measuring over time whether the output from the filter 128 continues to pure, measuring whether the flow from the filter 128 remains adequate (or whether it is clogged), and the like. The filler 128 may then report on its own status, such as whether it, or an element of it, should be replaced.

In embodiments, the water system 110 may include facilities for supply of cold and/or warm water separately for requirements of different types of beverages. For example, the water supply 124 may include cold water supply inlets and hot water supply inlets. The water supply 124 may be connected with a hot water tank, a cold water tank, a heating element, a refrigeration unit, a facility to cool the beverage that does not require a direct refrigeration system, or any combination of the above, and the like. The water system 110 may include hot water faucets as well as cold water faucets for receiving water for beverage preparation for direct dispensing. Various other electronic and electric controls such as intelligent sensors 130 may be provided for regulating operations of various components of the water system 110.

The gas system 112 may include one or more Kanban systems 132, which in embodiments are dual Kanban containers, with two distinct containers comprising parts of the dual Kanban system 132. In other embodiments, a single reservoir may be provided with sensors for determining the amount of gas remaining in a container, such as a pressure sensor, a strain gauge, or the like. Other embodiments may have three or more containers in the multiple Kanban system 132. The containers of the gas system 112 may include or may be coupled operatively with a source of carbon dioxide ($CO_2$), which may be a tank, or in embodiments may be one or more gas cartridges or similar containers, such as $CO_2$ cartridges 134 as illustrated in FIG. 1. One of ordinary skill will recognize that other gases may also or instead be utilized. The gas cartridges such as $CO_2$ cartridges 134 may supply pressurized $CO_2$ and/or other gases for preparing beverages. Where the pressurized gas may be used as a beverage ingredient in some beverages, such as carbonated sodas. The Kanban system 132 may have several chambers connected to several different cartridges 134. For example, a dual Kanban may contain or be connected to two chambers or containers or cartridges. The gas system 112 may switch between the different chambers or containers 132 to selectably use different gases contained in the different chambers 132 or to selectably use the same or different gases at different physical characteristics (e.g. delivered at different temperatures, pressures, or the like) and/or chemical characteristics (e.g., different elemental gases, mixtures or compounds) for use in preparation of different types of beverages or different customized beverages. In an example, the gas system 1112 may switch among different containers or chambers of a Kanban system 132, such as based on a threshold limit, such as when one of the chambers is half empty. The gas system 112 in such cases may send a signal to the host system 104 or other local processing/controlling units (e.g., CPU and memory) 138 to re-supply ingredient gases e.g., by automatically reordering cartridges) for the particular chamber which is either fully empty or is below a threshold level. In an example, the gas cartridges 134 may be connected to gas supply mechanisms and/or gas feed chambers that may supply the gases to the chambers. This may include connecting to a Kanban container 132. The gas system 112 or container or other component thereof (e.g., a switch) may be communicatively and operatively connected with an intelligent sensor 140. The intelligent sensor 140 may monitor levels of gases in various chambers of the gas system 112 and may compare with the threshold levels for generating a signal to re-supply the gases. The intelligent sensor 140 may allow opening and/or closing of different inlet and outlet valves to/from the gas system 112 for furnishing gases to/from the gas system 112. A user may supply desired gases at desired pressure levels from the cartridges 134 into the beverage reconstruction appliance 102.

In an example, the beverage reconstruction appliance 102 may take a $CO_2$ cartridge 134 such that $CO_2$ is delivered separately into the appliance 102. This may allow keeping $CO_2$ delivery systems under a certain size, such as to facilitate safe and inexpensive delivery, as pressurized $CO_2$ above a certain size may be considered hazardous, such as in mailing. Thus, separating the CO2 and selecting a safe size may offer a significant advantage in pricing and in managing supply chain for replenishment for the beverage reconstruction appliance 102. In an example, the multiple Kanban container 132 such as a dual Kanban, may be used for the gas system 112 (e.g. CO2 gas system) to keep a larger total supply of CO2 available while still keeping an individual bin size below the hazard threshold. By way of example, a dual Kanban reservoir system may work well for full service, remotely managed systems. A single Kanban with liquid level sensors and the ability to communicate with the replenisher may be appropriate for a self-serve solution or for a full service solution that may be less effective than the dual Kanban system, but still may be superior to the current situation, where users discover they are out of stock, then experience down time as they wait for an order to be filled.

In embodiments, the CO2 cartridges 134 or other consumables may be programmed automatically or set up manually to get auto-replenished. Auto-replenishment may occur through online-ordering or in any other manner such that the appliance 102 may be communicatively connected with an online supply chain management system either by the local processor 138 or through the host system 104, which may be connected to the supply chain management system 184. In order to enable an auto-replenishment mechanism, the appliance 102 may be configured as a smart connected or networked appliance 102 including a series of sensors (such as but not limited to those shown in FIG. 1) to identify consumption status, and a software back end solution to manage consumption data so that knowledge of the consumption data supports auto replenishment as well as optimization in the selection and management of the mix of SKUs. CO2 consumption status may be measured in several ways. A strain gauge on weight, a dispense counter that may simply count the number of CSD drinks poured and multiply by the average quantity of CO2/pour and/or a pressure monitor on the CO2 gauge may be some ways to determine CO2 consumption, among other options. The CO2 consumption information may be communicated through the networking facility 162 over a WWI network, LAN, and/or a gateway device to the local processor 138 or to the host system 104 that may enable proactive distribution through the connected supply chain 184. On line distribution of cartridges can be enabled, as the volume and weight of the majority of the water in the finished beverage can be postponed to the point of pour in accordance with certain embodiments disclosed herein. The networked appliance 102 configured for online ordering and auto replenishment may overcome the inconvenience of sourcing replacement filters and larger CO2 cartridges. This may avoid requirement of an onerous behavioral change for consumer end users.

The gas system 112 may be defined in conformance to TSA regulations that limits distribution of pressurized CO2 canisters. In an example, ground distribution may be allowed.

In an aspect, the gas handling system may be adapted to accept CO2 cartridges that are sized below one hundred grams; in another aspect, the gas handling system may be adapted to accept CO2 cartridges that are sized below 88 grams. This may be because transportation agencies allow the shipment of CO2 gas containers below a certain weight threshold. Thus, certain sizes may overcome the need to visit a retailer to get CO2 refills.

The flavoring pod system 118 may include multiple Kanban bins 142 for storing different flavors for use as ingredients in the preparation of beverages. The multiple Kanban bins 142 may be operatively coupled to several flavor pods 144, each containing a different flavor or ingredient of a flavor to be placed by a user into the appliance 102 for specific beverage preparation in accordance with customized flavor requirements and preferences. The nature and quantity of different flavors may be controlled by a user based on the user's preferences using the flavoring system 118, such as one based on a pod or cartridge. Similar to the Kanban container for gases, the multiple Kanban bins 132 for flavors may also switch among the different bins for selectably using different flavors contained in the different bins. In various embodiments, various facilities (such as a Kanban) may be provided for selectably using the same or different flavors having different physical and/or chemical characteristics for use in preparation of different types of beverages or different customized beverages. For example, a pod may contain syrup for a cola drink, while another pod contains cherry flavor, such that a user can empty both pods to produce a cherry cola drink in addition to using individual pods for a cola or cherry drink, respectively. In embodiments, bins for common flavorings may contain enough material, e.g., syrup, to produce multiple servings of a beverage, such as a cola. In an example, the flavoring pod system 118 may switch to a different bin or container of a multiple Kanban system, the switching indicating that a particular bin is empty (such as by a threshold limit, such as that the chamber is half empty). In embodiments, upon recognition that a container is empty, the flavoring pod system 118 may send a signal to the host system 104 or other local processing/controlling units 138 to re-supply ingredient flavors for the particular bin or container which is either fully empty or that is below a threshold level.

The multiple Kanban bins 142 may be communicatively and operatively connected with an intelligent sensor 148. The intelligent sensor 148 may monitor levels of flavors in various containers or bins and compare with the threshold levels for generating a signal to re-supply the flavors. The intelligent sensor 148 may allow opening and/or closing of different inlet and outlet ports to/from the flavoring pod system 118 for furnishing flavors to/from the flavoring pod system 118. A user may supply desired flavors at desired pressure and temperature levels from the flavor pods 144 into the beverage reconstruction appliance 102.

The sweetener system 114 may also include one or more containers (which in embodiments may comprise a Kanban container 150) that receive different sweeteners 152 for desired sweetening effects in beverages. A user may select from among the sweeteners 152 and customize a beverage for different sweetening effects and for an overall degree of sweetness. For example, a user may select a low calorie artificial sweetener, such as aspartame, sucralose, or the like, a higher calorie sweetener like high fructose corn syrup (HFCS) or a natural sweetener like stevia or cane sugar, or a desired mixture of any of those. In embodiments the sweetener system (such as using a multiple Kanban system 150) may switch between the different containers for selectably using different varieties of sweetening agents contained in the different containers or for selectably using the same or different sweetening agents with different physical (e.g., temperature) and/or chemical characteristics for use in preparation of different types of beverages or different customized beverages. In an example, the sweetener system 114 may switch to a different container, indicating that a particular container is empty or below a threshold limit, such as when the container is half empty. The sweetener system 114 in such cases may send a signal to the host system 104 or other local processing/controlling units 138 to re-supply ingredient sweetening agents for the particular container which is either empty completely or by a threshold level. The sweetener system (including, as applicable, the Kanban container 150) may be communicatively and operatively connected with an intelligent sensor 154. The intelligent sensor 154 may monitor levels of sweeteners 152 in various containers 150 and compare with the threshold levels for generating a signal to re-supply the sweeteners 152. The intelligent sensor 154 may allow opening and/or closing of different inlet and outlet ports to/from the sweetener system 114 for furnishing sweetening agents or sweeteners 152 to/from the sweetener system 114. A user may supply desired sweeteners 152 into the beverage reconstruction appliance 102.

In an example, the sweetener system 114 may include a 'two-bin' Kanban for the sweeteners 152 such as a primary bin and a backup bin. When a user has to change an empty container or bin, a refrigerated second bin or container may be used to allow pouring of a drink at a proper temperature immediately, without delay during switching, so as to maintain the availability of beverages at desired temperatures, with desired carbonation levels, to support "trademark" levels of quality, even during re-supply. For cooling the sweetener or other components, a refrigeration system 158 may be provided. In an example, auto-switching of an empty bin or container may be done by utilizing liquid level sensing devices, such as through the intelligent sensor 148. In an example, a thermistor may be provided to confirm if the sweeteners in both the bins are at the proper temperature.

The refrigeration system 158 may also be used to generate ice, which may take water from a water system source and make ice available, such as through an ice dispenser. The refrigeration effect may also be achieved through the user's addition of ice (such retrieved from an adjacent refrigerator or ice maker). Ice may be used in typical cube form or, in embodiments, it may be ground or shaved by the appliance; that is, the appliance may include an ice shaver, grinder, or the like, which may be associated with appropriate sensors for control and reporting of actions. In either condition the ice may be positioned in an ice reservoir 214 that is located physically adjacent to the water reservoir, thereby adding a conductive cooling effect to the water. At a prescribed temperature of the water, the appliance may complete the beverage generation, potentially using the crushed, shaved or cubed ice as an ingredient in the drink. Further, through intelligent sensing of the temperature of the water, and intelligent information about the nature of the ice, an ice melt factor can be calculated, which can be used by the methods and systems disclosed herein to adjust the water quantity and insure proper syrup-to-water ratios that factor in the melting of the ice into water.

The beverage mixing appliance 102 may further include a cooling system 208 that may be operatively coupled to the sweetener system 114 or refrigeration system 158, the water system 110, the beverage delivery system 122 and with other sub-systems of the beverage mixing appliance 102 as needed. In some examples, the beverage mixing appliance 102 containing the cooling system 208 may be used to prepare fountain beverages that may be typically offered with ice, and many times a consumer may want to put ice in the beverage. The beverage mixing appliance 102 may include or be coupled to a beverage dispenser through which the consumer may want to consider ice as an appropriate and compelling ingredient along with the beverage prepared by the beverage mixing appliance 102. Unlike in most conventional cold beverage appliances, the beverage mixing appliance 102 may facilitate adding of ice to the beverage separately through the cooling system 208. The beverage mixing appliance 102 may prepare the fountain beverages and serve them at or near 40 degrees F., so that the beverages may not particularly require ice for cooling, although it can be used to retain a lower temperature for some time. The consumer may however choose to put ice in a fountain drink for extra chilling or may want to preserve the cold temperature, may want to enjoy the mouth feel of ice (particularly ground, shaved, or crushed ice), which may be an experience not conveniently replicated in a packaged beverage. The beverage mixing appliance 102 may provide this experience to the consumer or user easily by incorporating cooling features provided by the cooling system 208, including generating ice in desired shapes and sizes, such as ground, shaved or crushed ice. The beverage mixing appliance 102 may take ice that is crushed, ground or the like and mixed with carbonated water prior to or simultaneously with mixing with other ingredients.

In embodiments the cooling system 208 may be a vapor compression system (such as a low cost vapor compression system), a thermo-electric system, a capacitive cooling system (such as an ice bank), an ice crushing system (such as using ice for cooling and as an ingredient), a circulation system (such as used in ice cream makers), a cooling plate with surface area to which ingredients are exposed, a eutectic cooling system, or other kinds of cooling systems. In embodiments, the various other kinds of cooling systems (e.g., thermoelectric or vapor compression) may be used to create an ice bank for capacitive cooling.

The beverage mixing appliance 102 may leverage ice in many other ways. For example, chilling water from the cooling system 208 may allow achieving high quality beverage results. The cold temperature may also enable a desired high degree of carbonation. Chilling of water by the cooling system 208 effectively may be achieved by providing various mechanical and/or electrical components and mechanisms in the cooling system 208. A vapor compression system 210 may be used for coolers, fountain systems and vending machines including a compressor, a condenser and an evaporator for example. Other technologies that are less expensive such as thermoelectric plates, and the like, may also be used, perhaps in combination with a capacitive cooling system like an ice bank, depending on the end results required. The cooling system 208 may include or be coupled to a water reservoir 212 and an ice reservoir 214. The consumer may load a quantity of water into an aluminum (or other high heat transfer material) reservoir that may reside inside or adjacent to the ice reservoir 214. Alternatively, the consumer may connect a water supply to the appliance. The consumer may be instructed to use cold water to facilitate the process. After a prescribed amount of time or preferably at a prescribed temperature, dispensing of the beverage may be enabled. The design of the water reservoir may facilitate the storage of chilled water in a refrigerator, and said storage may be guided by appropriate graphics, language, displays, instructions and the like, directed to the consumer.

In various examples, a variety of product options may be provided by the beverage mixing appliance 102 based on use of chilling water and/or ice. For example, a pod of syrup may be used and placed in physical contact with the ice reservoir 214, such as adjacent to the reservoir, so that the pod is cooled by the conduction between the pod and the holder of the cooled water and/or ice. As the syrup typically represents about one-sixth of the beverage volume, pre-chilling the syrup may be desired. The beverage mixing appliance 102 may allow blending of the syrup into carbonated water and then introducing carbonation, thereby carbonating the entire beverage. This may allow achieving higher levels of carbonation and potentially better Brix stratification. In another product solution, smaller versions of the liquid containers referred to as BIBS, which are used in restaurants and similar situations may be used, Which may enable multi-beverage applications. In still another example, the cooling system 208 may allow shaving or crushing the ice, as the consumer may tend to prefer shaved ice to cubed ice in beverages, or vice versa. In various examples using the ice or chilling water from the cooling system 208, various dispensing options may be provided by the beverage mixing appliance 102. For example, a consumer may wish to drop the ice into the cup first. Quickly thereafter, carbonated water and syrup may be dispensed. They may be dropped in substantially simultaneously (as in a typical fountain system or pre-mixed in the mixing system 120 as described above. In another example, the water may be carbonated first but still the syrup may be added in the mixing system 120.

In embodiments, a cooling system 208 may comprise a thermo-electric cooling system. Such a system may build an ice bank over time that can be deployed for cooling capacity as needed, such as during storage of ingredients, during mixing, during transit (such as through conduits), or in a beverage itself.

In embodiments, a lower cost version of the appliance may omit a cooling system, relying instead on the placement of ice by the consumer, such as taken from a nearby ice maker. Such an appliance may use ice both as a pre-cooling mechanism for ingredients within the appliance and as an ingredient in a mixed beverage. In such cases, to encourage rapid cooling of the beverage, a facility for handling ice, such for grinding or crushing it, may be located adjacent to ingredients that need to be cooled, such as the syrup, water, and liquid sweetener. For example, conduits that deliver a serving of a beverage could be routed through an ice hank, ice holder, or, if available, an ice maker, so that small amounts of fluid are pre-cooled as they transit toward mixing in the beverage (such as in the cup). Arrangements like those used in hand-driven ice cream makers (where ice is located around the perimeter of a mixing chamber), ones in which ice is located centrally and surrounded by liquid ingredients, ones in which ingredients are routed via conduits (e.g., snaking configurations) through the ice to expose the ingredients to conductive heat transfer, and others may be contemplated, each adapted to encourage exposure of liquid ingredients to ice during storage, during transit, during mixing, or in the cup.

In embodiments, mixing may involve simultaneous mixing of syrup and water and carbonation. If that occurs in a chamber that is cooled by an adjacent containing ice that is placed by a user (optionally one in which ice is ground), desired cooling can be accomplished without a power-using cooling system. Ice can be stored around the mixing chamber so that heat thermally transfers across a barrier (e.g., metal) between the ice and the mixing chamber. In embodiments a grinder could be located below the ingredient mixing chamber and the ice holder chamber, so that once ice is ground, the mixed, carbonated liquid and the ice are dropped via the same chute into a cup.

In an embodiment, one might circulate water or other liquid ingredients through the ice.

In embodiments, a thermo-electric plate may be configured, such as in a grid, or serpentine configuration, to pre-cool water before it is placed in the beverage. In each of these embodiments the cost of vapor compression is avoided by pre-cooling water or other liquid ingredients to a near-optimal temperature, then relying on ice in the cup itself to complete the path to the desired beverage, e.g., "trademark" quality beverage.

In an example, the various cartridges, containers, pods, chambers, bins and the like may be deployed with anti-counterfeiting measures, such as tampering sensors, ingredient sensors for identifying marker arrangements that may validate a legitimate ingredient and the like, and physical structures that ensure a unique 'lock and key' fit between a pod or container or cartridge or chamber or bin and the beverage mixing appliance 102.

Figure 2:
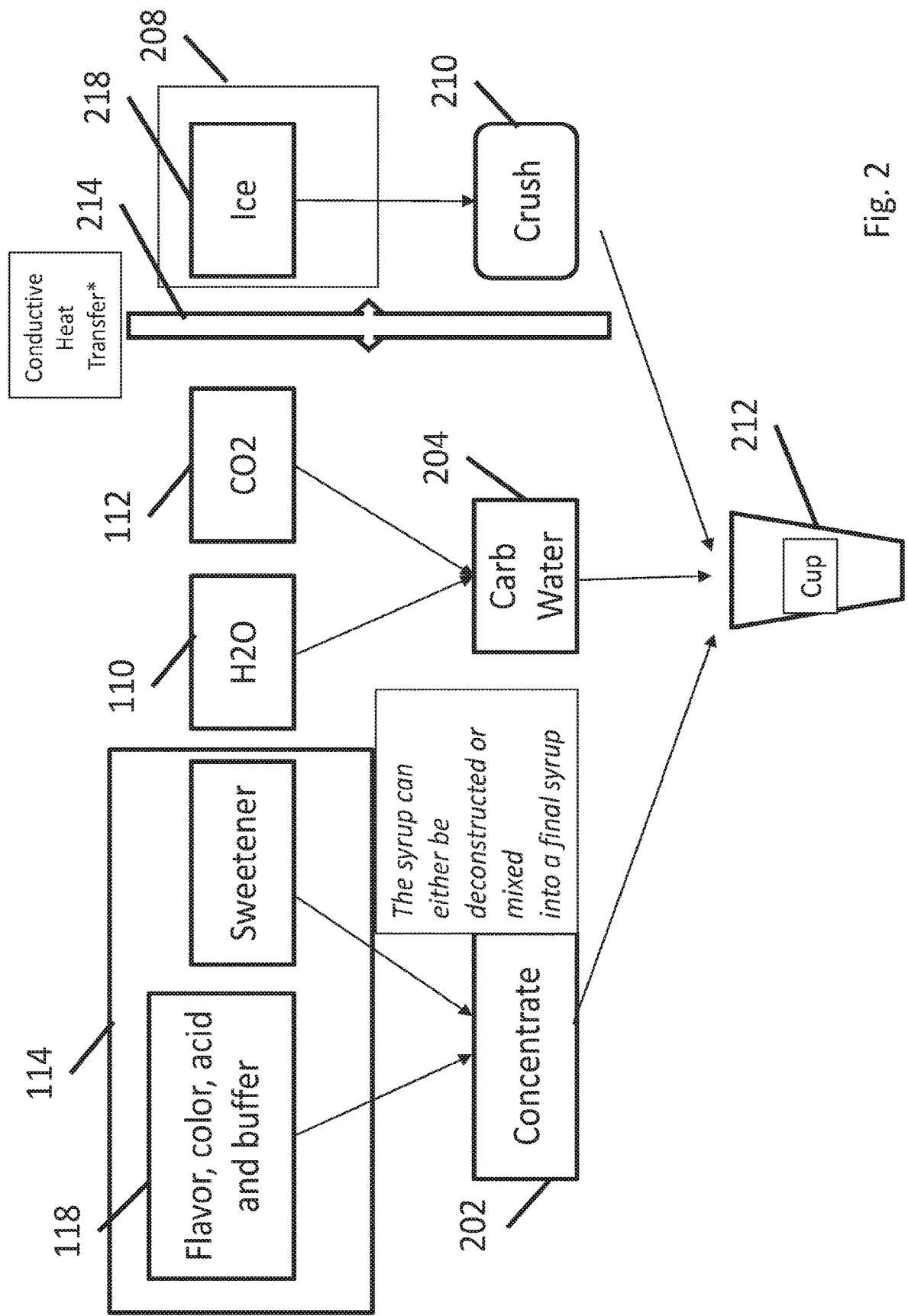
FIG. 2 provides a block diagram of an arrangement for housing ingredients in which an ice crushing system is used to pre-chill water before carbonating a beverage.

FIG. 2 provides a block diagram of an arrangement for housing ingredients in which an ice crushing system is used to pre-chill water before carbonating a beverage. Water from the water system 110 and CO2 from the gas system 112 are used to create carbonated water 204. The water system 112 may be disposed along a conductive heat transfer facility 214, such as made of a heat conducting material, such as metal, adjacent to the cooling system 208 that makes ice, or simply an ice repository, such as idled by a user from a nearby ice maker. The system that makes or holds the ice may include a crushing facility 210 for crushing the ice. The sweetener system 114 may house a sweetener, such as sugar, and the flavoring system 118, such as a pod-based flavoring system, may be housed together with the sweetener system 114. The flavoring system may include flavors, colors, acids, buffers, and the like, as well as artificial sweeteners in cases of diet beverages. In embodiments, a concentrated beverage ingredient, or concentrate 202, such as a syrup, syrup ingredient, juice concentrate, or the like may be deconstructed into various components or sub-components, and housed separately, then mixed to form the concentrate 202, while in other embodiments the concentrate 202 may be provided and housed as a complete item. References to a syrup or concentrate throughout this disclosure should be understood to encompass, except where context indicates otherwise, any concentrated ingredient or ingredients, such as a syrups, juice concentrates, or the like. The concentrate 202, carbonated water 204 and crushed ice 210 may be delivered to a cup. In embodiments, the ice crushing sub-system 210 may be used to pre-chill the water before carbonation. The concentrate 202 or sweetener may also take advantage of conductive cooling from the ice.

Figure 3:
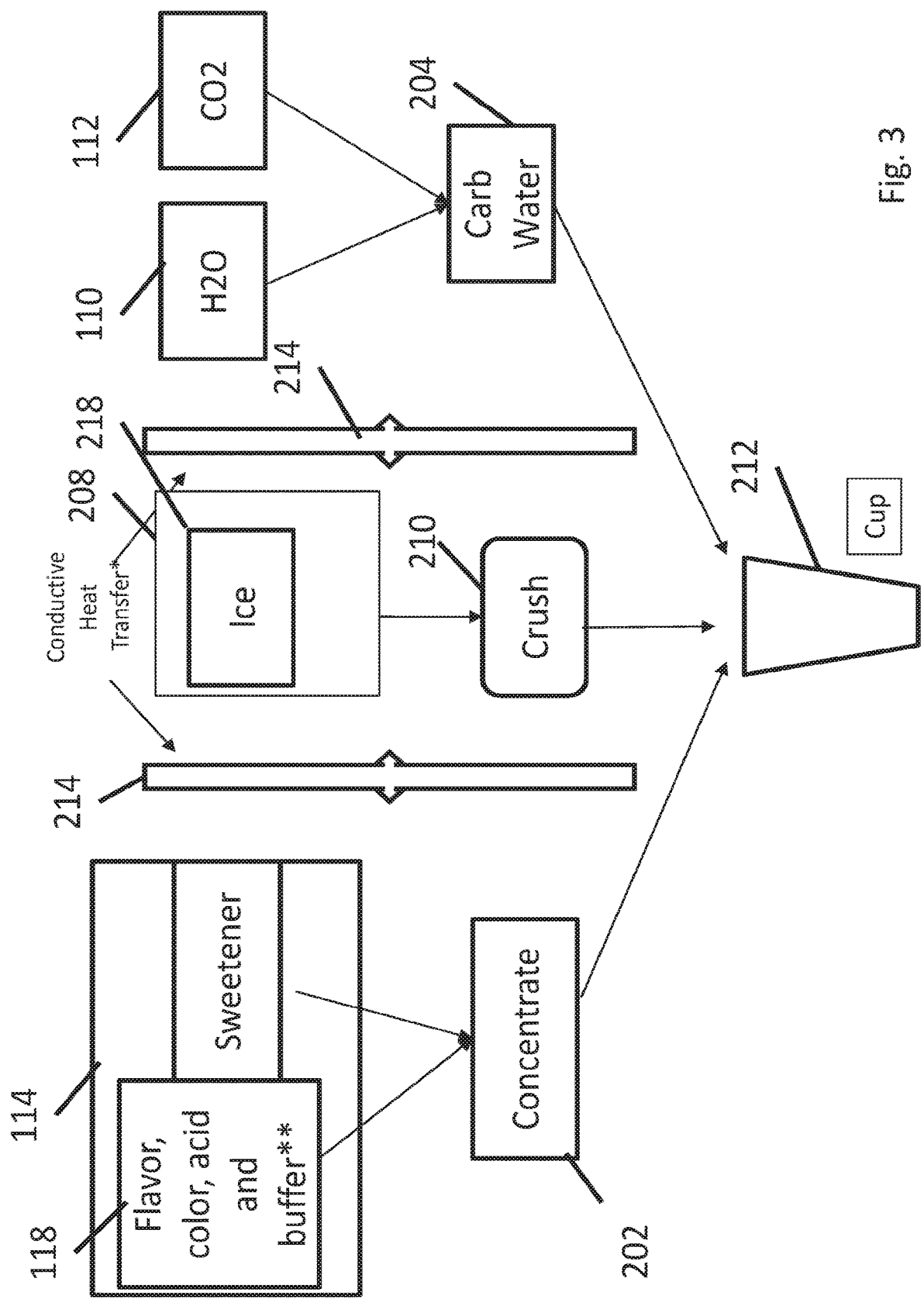
FIG. 3 provides a block diagram for a system in which an ice sub-system is used as a pre-chiller for water and syrup.

FIG. 3 provides a block diagram for an embodiment of a system in which an ice sub-system 218 is used as a pre-chiller for water and syrup. The water system 110, as well as the flavoring system 118 and sweetener system 114 may be housed adjacent to respective conductive heat transfer facilities 214 from the cooling system 218 or other repository for the ice 218, so that the ice 218 cools the water, flavoring and sweetener. The crushing system 210 crushes ice that is then delivered to the cup 212 along with concentrate 202 and carbonated water made from the water system 110 and the gas system 112. Here the ice system is used as a pre-chiller for both the water and the concentrate 202. Alternatively, the sweetener alone can be pre-chilled, as it represents the majority of the volume of the syrup. Further cooling of both water and syrup can be enhanced via vapor compression or thermal electric systems as noted elsewhere in this disclosure.

Figure 4:
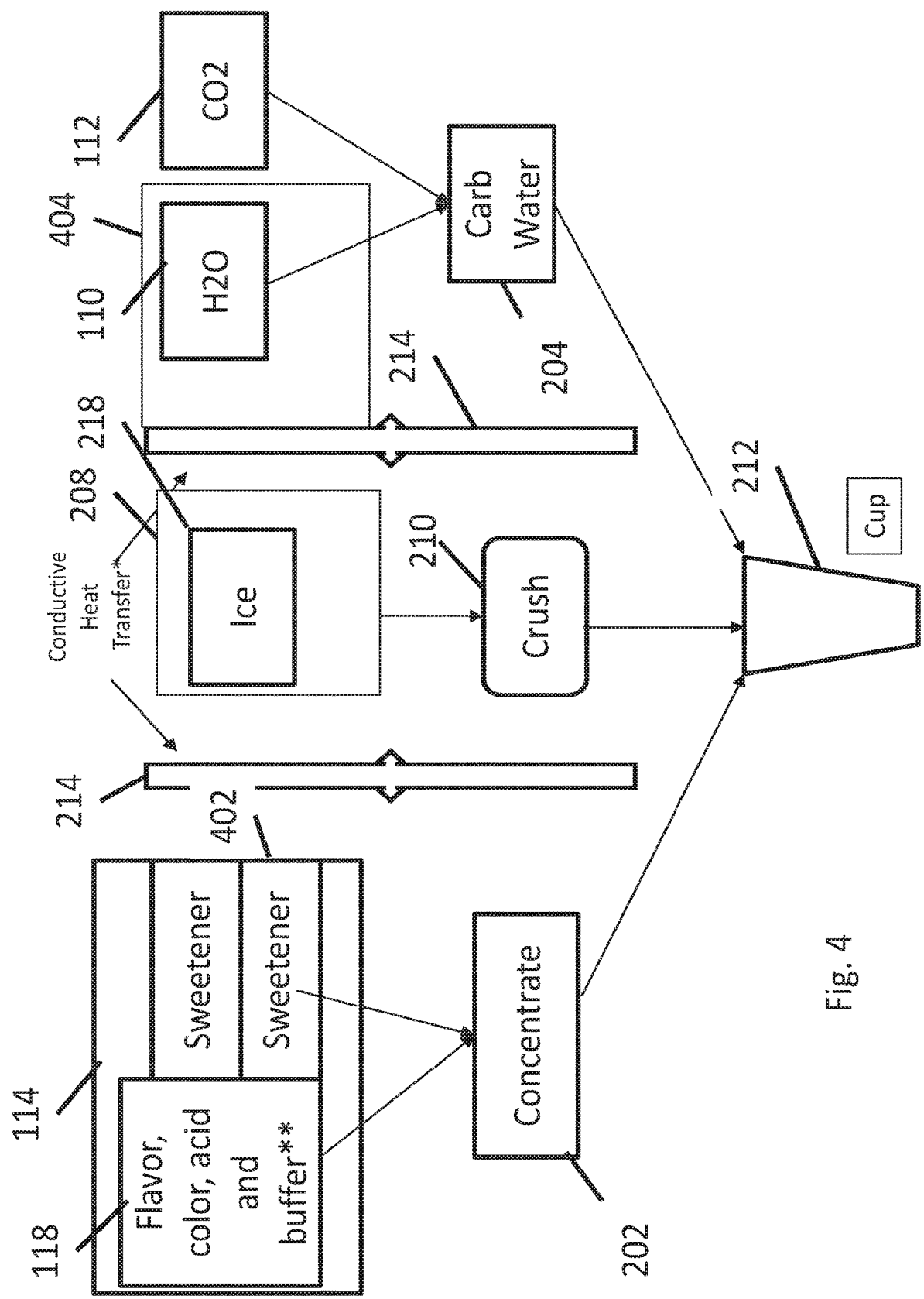
FIG. 4 provides a block diagram of a system in which dual kanbans are used to house sweeteners.

FIG. 4 provides a block diagram of an embodiment of a system in which dual kanbans 402 are used to house sweeteners. In this embodiment the water of the water system 110 may be held in a conductive container 404 (e.g., made of metal or other heat-conductive material) that may have a heat-conductive connection across the conductive heat transfer facility 214, so that it will be cooled by the ice 218 in the cooling system 208 or ice repository. In embodiments, the conductive container 404 may be removable and replaceable by the user. In such embodiments, a user may be provided with two conductive containers 404, so that the user can store one container in a cool place, such as in a nearby refrigerator, for cooling while the other container is in use. This provides a ready source of low temperature input water at all times, making it easier to produce a high quality beverage without requiring an expensive or high performance cooling system 208 (or perhaps omitting the cooling system 208 entirely, relying only on ice provided by the user and the cool input water to achieve the desired temperature). In this embodiment, the dual sweetener containers (optionally kanbans) are also disposed across a heat conducting boundary from the cooling system 208 or ice repository, so that the syrup is also cool when delivered to the cup 212 along with the ice 218 that is crushed by the crushing system 210 and the carbonated water made using the water system 110 and the gas system 112. The dual kanban embodiment of a dual sweetener arrangement 402 may provide advantages disclosed throughout this disclosure, such as offering alternative forms of sweetener, facilitating timely replacement and the like. The dual bins also allow a small sweetener bin that is under current use to be placed adjacent to the conductive heat transfer boundary 214, so that the small volume is rapidly cooled to the desired temperature, while ensuring that a sufficient supply is available through the second bin.

Figure 5:
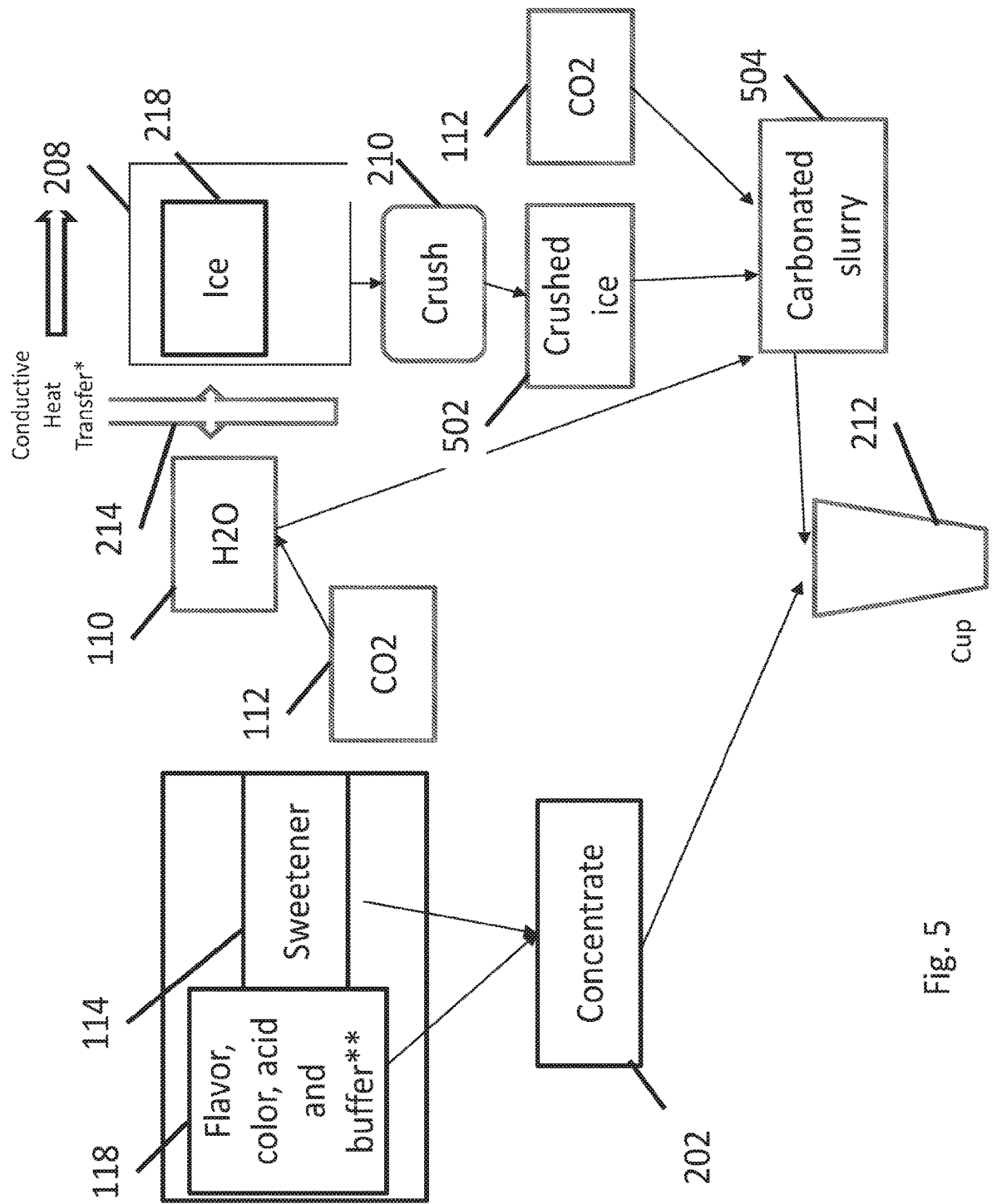
FIG. 5 provides a block diagram of a system in which ice is crushed before integrating with non-carbonated water, and carbonation is added to form a carbonated slurry.

FIG. 5 provides a block diagram of an embodiment of a system in which ice 218 is crushed in the crushing system 210 before integrating with non-carbonated water from the water system 110, and carbonation is added from the gas system 112 to form a carbonated slurry 504. The water may be stored across a heat conductive boundary 214 from the cooling system 208 or ice repository, so that it is pre-chilled before being added to the slurry 504. Pre-chilling of the water may be accomplished through a vapor compression system or by using a thermo-electric plate, one or both of which may augment the effect of the conductive cooling. As in other embodiments, concentrate 202 may be made from ingredients from the flavoring system 118 and sweetener system 114. This embodiment has ice crushed before integrating with non-carbonated water, and the CO2 is added to form the slurry 504. In alternative embodiments the CO2 112 may be added to the slurry 504, or it may be mixed with the water in advance of forming the slurry. The concentrate 202 (whether pre-mixed or not) may be added to the slurry 504 to form the final, carbonated beverage.

Figure 6:
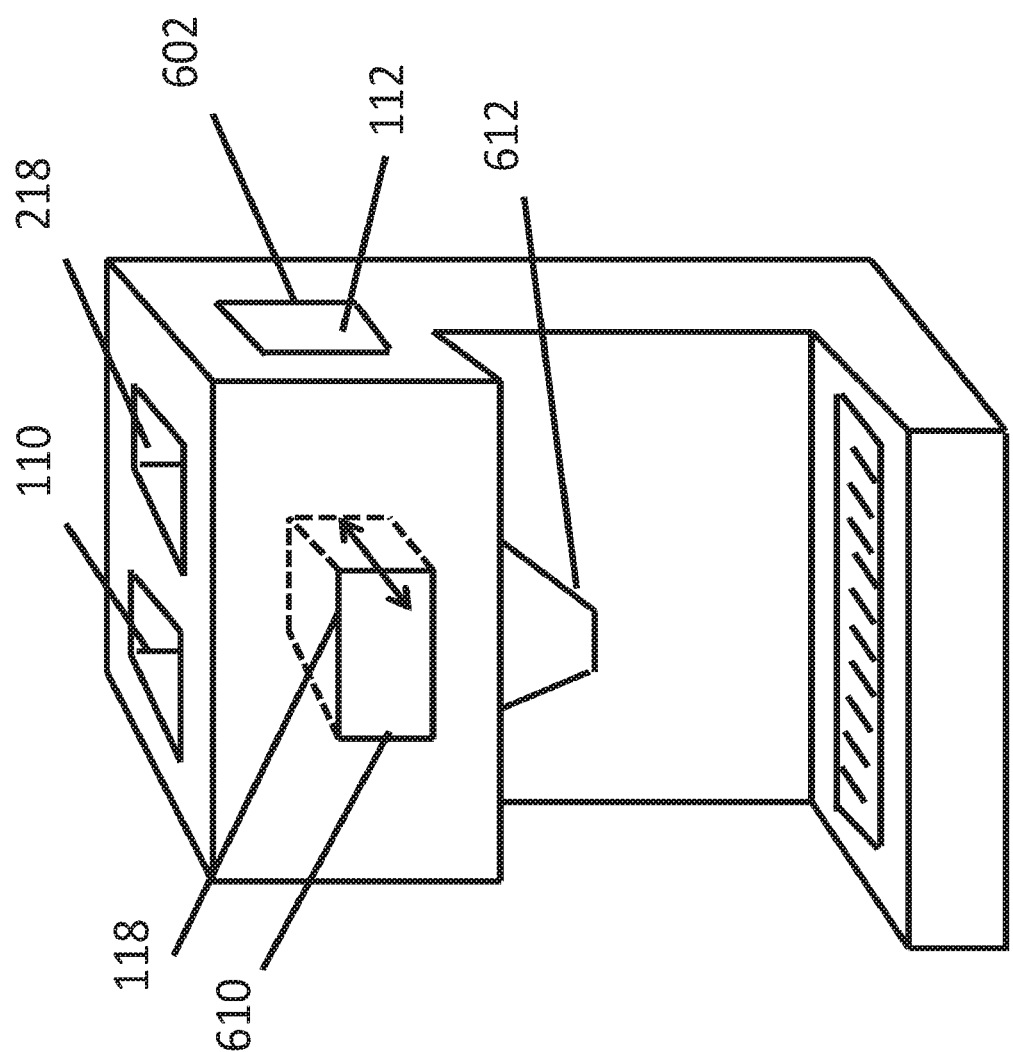
FIG. 6 illustrates an embodiment of an arrangement of components of a beverage mixing appliance.

FIG. 6 illustrates an embodiment of an arrangement of components of a beverage mixing appliance. A water system 110 and a repository for ice 218 are placed at the top of the appliance to allow the user to add water or ice, such as by pouring or by inserting an appropriately fitting container. A drawer 602 on the side of the appliance provides a location for the gas system 112, such as for inserting CO2 cartridges used for carbonation. A drawer 610 is used for the flavoring system 118, such as allowing a user to insert flavoring pods 144. A nozzle 612 feeds various ingredients, including carbonated water, sweetener, flavor, and ice into a cup that can be place below the nozzle. The appliance may house internally the various other sub-systems and components disclosed throughout this disclosure.

Figure 7:
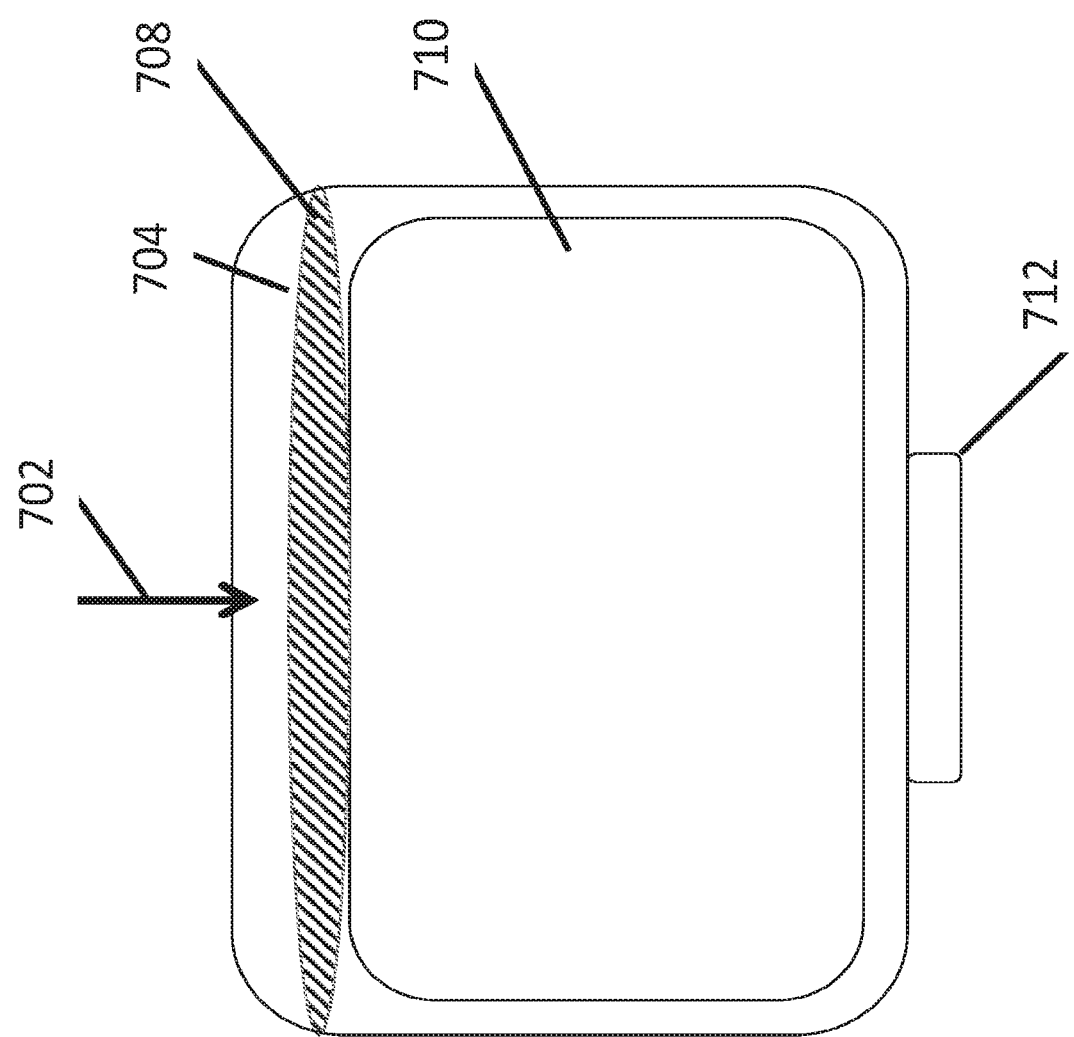
FIG. 7 illustrates an embodiment of use of a disc system wider force to assist in evacuating syrup from a flexible container.

FIG. 7 illustrates an embodiment of use of a disk system under force to assist in evacuating syrup from a flexible container. A flexible pouch 710 houses a liquid ingredient, such as pre-mixed concentrate 202 comprising flavors, sweeteners, and the like, or comprising liquid sweetener. A foil seal layer 704 may seal the pouch 710. A substantially rigid disk 708 may be disposed on one side of the pouch 710, such as to allow a force 702 to push on the disk to force the liquid to evacuate the pouch through an opening on the opposite side. A foil or other facility 712 may be used on the opposite side of the pouch 710, such as to seal the pouch 710 until it is ready to be emptied, at which point it may be punctured, such as by an interface with a conduit to which the pouch 710 will deliver the liquid when force 702 is imposed on the disk 708, resulting in the collapse of the pouch 710 and the evacuation of the liquid through the opposite opening. The dispensing force 702 may be controlled by the control system 170 to deliver the correct amount of liquid, optionally in response to sensing the amount of liquid being dispensed. This approach may be used for a single serve or multiple serve container, so dispensing force 702 may be adjusted appropriately, such as based on an algorithm under control of a processor, depending on whether the first serving, a subsequent serving, or the last serving is being dispensed in cases of multiple serving containers. In such an embodiment, the syrup may be filled in the plastic pouch 710 with a rigid disk 708 placed on top. The force 702 is applied to the rigid disk 708 to evacuate the liquid syrup at a controlled rate. The force 702 can be generated by various mechanisms, such as by using a motor-driven piston (e.g., using a stepper motor), by applying force from a pump (e.g., a pump used to pump in carbonated or non-carbonated water), from a spring force (optionally with appropriate damping), or the like.

Figure 8:
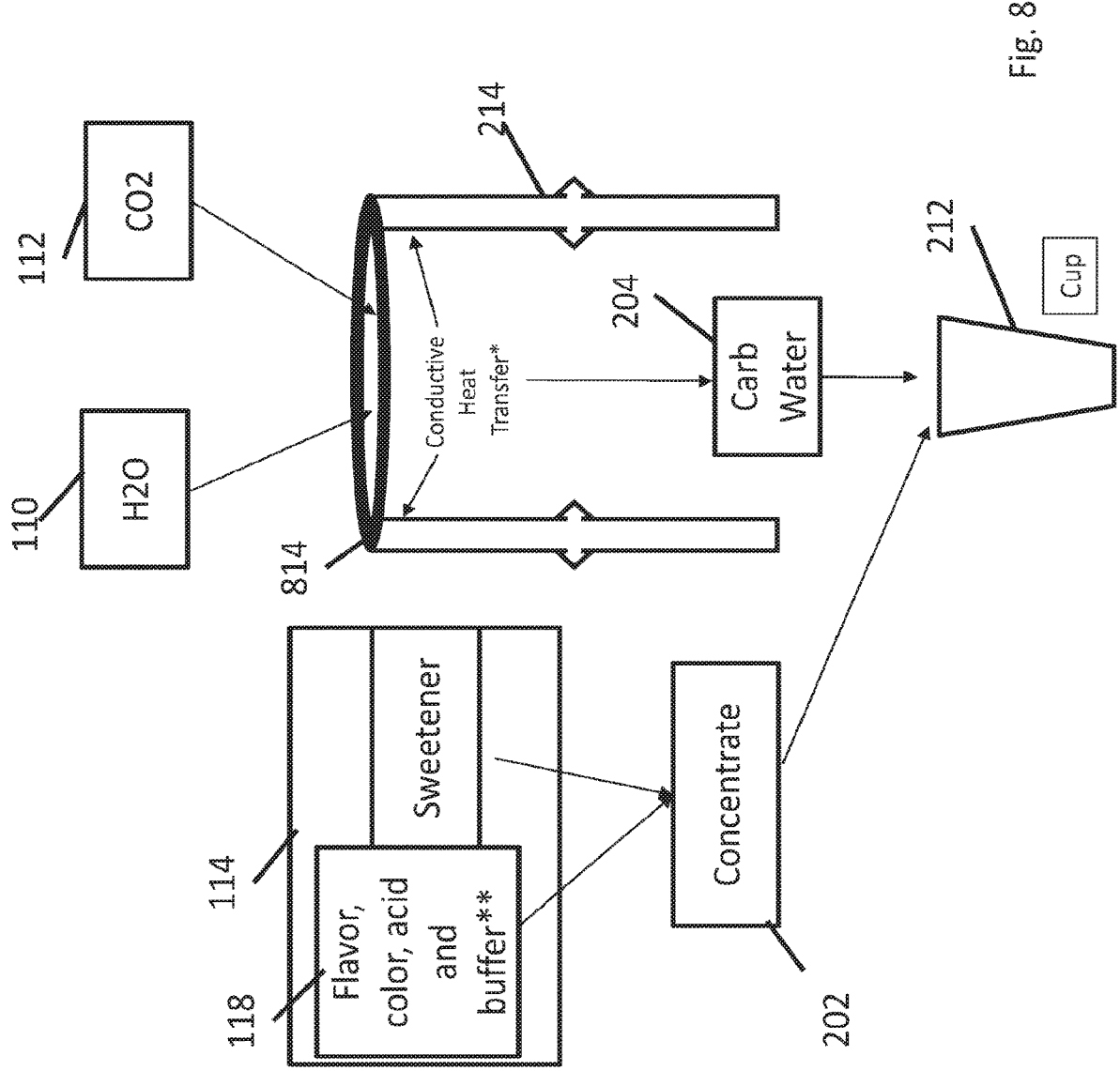
FIG. 8 illustrates an embodiment of a system in which a cold bowl with a eutectic cooling fluid is used to provide cooling.

FIG. 8 illustrates an embodiment of a system in which a cold bowl with a eutectic cooling fluid is used to provide cooling. In this embodiment, a cold bowl 814, similar to those used in ice cream makers, may be stored in a freezer prior to use. The cold bowl 814 may include a cooling fluid, such as a eutectic cooling fluid, to facilitate conductive heat transfer, such as to help cool the carbonated water 204 or other ingredients prior to delivery: to the cup 212.

Figure 9:
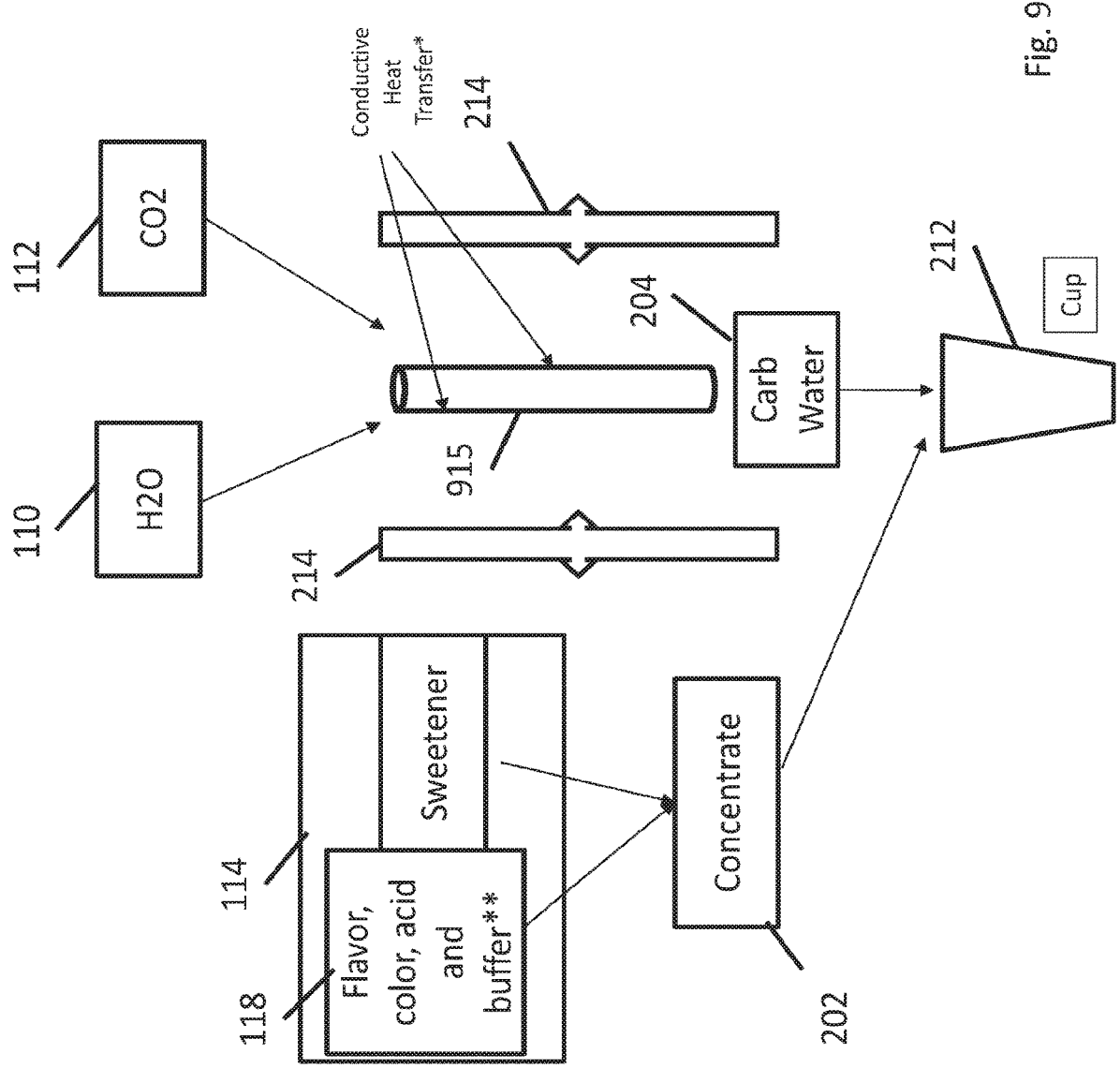
FIG. 9 illustrates an embodiment of a system in which a cold tube with a eutectic cooling fluid is used to provide cooling.

FIG. 9 illustrates an embodiment of a system in which a cold tube with a eutectic cooling fluid is used to provide cooling. A cold tube 915, similar to those used in table-top cooling beverage dispensers, may hold a cooling fluid, such as a eutectic cooling fluid. The tube 915 may be stored in a freezer prior to use and then placed in an ambient chamber 214, such as a chamber that has conductive heat transfer properties, such as to allow cooling of carbonated water 204 or other ingredients.

The various ingredients such as water from the water system 110, pressurized gas from the gas system 112, different flavors from the flavoring pod system 118, and sweeteners from the sweetener system 114, ice from the cooling system 208 may be directed to the mixing system 120 where the ingredients may be allowed to enter in a quantity and proportion prescribed through user custom preferences or through the specifications of the provider for preparing a customized or otherwise specified beverage. The mixing system 120 may mix the various ingredients coming from various chambers, Kanban systems, and bins, to prepare a mixture for the beverage or for further processing in other systems. The mixing system 120 may include tubes, valves, conduits, and the like, such as for selectively introducing one or more source liquids into a flow for a mixture. In embodiments, the mixing system 120 may be coupled to or include power mixers for fast blending or mixing of the ingredients. The mixing system 120 may utilize heating elements or inductive couplings, and the like, to introduce heat into the mixture for fast blending. The heating effect may be enhanced by the use of high power LED arrays, especially for frozen or cold slurry of ingredients. Various mechanical arrangements such as rotary shafts, blades, mechanical agitators, motors, etc. may be provided in the mixing system 120 for efficient blending/mixing. The mixing system 120 may be coupled operatively and communicatively with or may include an intelligent sensor 160 to allow monitoring of pre-programmed recipes and mixing of the ingredients in accordance with the pre-programmed recipes of beverages as may be controlled or instructed by the host system 104 remotely or through a local controller or processor 138 for execution of heating, cooling, pressurization/de-pressurization, blending, and 'mixing time' parameters etc. during the mixing process. In various examples, the ingredients obtained from various systems may be stored, replenished, and mixed in the mixing system 120 under control of the mixing system 120 with the use of a local processor or controller 138 managed by a user or through the remotely located host system 104 for managing the beverage mixing appliance 102.

In an example, sensed data or reports gathered by on-device sensor units or controllers such as the intelligent sensor 128 coupled to the water system 110, the intelligent sensor 140 coupled to the gas system 112, the intelligent sensor 148 coupled to the flavoring pod system 118, the intelligent sensor 154 coupled to the sweetener system 114, and various other sensing or intelligent units associated with or deployed at the sub-systems and components of the beverage mixing appliance 102 may be communicated to the local processor or controller or control system 138 and the networking facility 162 via one or more bus 164. The sensed data and reports may for example contain information pertinent to processing actions executed at various sub-systems. For example, the intelligent sensor 128 at the water system 110 may communicate data related to water treatment, water composition, mineral constituents, unwanted materials present in the water supply, and the like, processing steps for water treatment, etc. The intelligent sensor 140 at the gas system 112 may supply information related to pressurization of gas received from the cartridges 134, availability of the gas in the cartridges 134, etc., to the local controller 138.

The local controller 138 (also referred to as controller or CPU or control unit or processor or processing unit, interchangeably and without limitation except where context indicates otherwise) may be configured to receive the sensed data or reports from the various intelligent units or sensors through the bus 164 for data processing and decision making to execute instructions accordingly for further processing by the sub-systems and for material replenishments through bins, cartridges, chambers, etc., in the networked reconstruction beverage appliance 102, including based on user preferences, vendor specifications, stored rules and the like. Such rules may be stored digitally in a memory included within or coupled to the controller 138. The stored rules in association with the data received from the sub-systems may generate an output for executing the instructions. For example, the memory may store rules defining capacity of various bins and cartridges, and if the sensed data indicate that ingredients in a particular bin or cartridge or container is almost empty or has reached its threshold limit, the controller 138 may send instructions to a user or to the sub-systems for replenishment of the cartridge or bin or container. In accordance with an example, the controller 138 may include or be communicatively coupled to various interfaces and controls 168, ingredient control 170, and other processing components for allowing the controller 138 to perform programmed instructions in conjunction with user inputs, user preferences, stored data, stored rules, and sensed data retrieved from the intelligent units or sensors.

In an example, the sensed data or reports may be communicated to the remote application management host system 104 through the bus 164, such as for processing of the data at a remote location and to control the beverage mixing appliance 102 and various sub-systems thereof from remote. The remote application management host system 104 can set desired values for different parameters that may influence taste, color, flavor, smell, temperature, sweetening, mix of ingredients, and other characteristics of a beverage ultimately delivering a customized beverage to a user. The parameters may be specified by a user through an interface 172 that is provided at the remote appliance management host system 104 or that may be pre-defined for different user categories in a rules engine 174. The rules engine 174 may store rules for creating pre-programmed recipes of beverages for a specific user or user group, so that instructions may be sent from the appliance management host system 104 to the beverage mixing appliance 102, and sub-systems thereof, for preparing a specific customized beverage for the user or user group. For example, a franchisor may specify beverage ingredients, temperatures, ice levels, and other parameters for a given beverage, which may be stored and executed in appliances that are deployed by the franchisees of that franchise.

The appliance management host system 104 may include a CPU and memory 178 that may execute programmed instructions stored in the appliance management host system 104 in accordance with the rules stored in the rules engine 174. The appliance management host system 104 may include an ingredient control 178 that may control ingredients quantities in preparing a beverage. The ingredient control 178 may send instructions in association with the CPU and memory 178 to the various containers, bins and cartridges such as 134, 144, 142, 150, 152, and the like, such as for causing necessary ingredients to move into and through the networked beverage appliance 102, and through the various conduits and sub-systems thereof, for preparing a beverage. In accordance with an embodiment, the ingredient control 180 may send instructions to material supply systems such as water supply 124 for allowing water to flow toward the water system 110 once the intelligent unit and/or sensor 130 sends a signal to the appliance management host system 104 indicative of replenishment of water.

In another embodiment, the appliance management host system 104 may allow a user to specify his or her preferences and requirements for a beverage through the user interface 172. The user interface may comprise a screen (such as a menu screen, touch screen, or the like), one or more buttons, dials, sliders, or the like (which may be on screen, embodied in hardware, or presented on the interface of a remote device, such as a remote control and/or smart phone or similar device of the user). The user may provide requisite details (such as specifying a flavor, a level of sweetness, a temperature and/or a type of sweetener), and the appliance management host system 104 may send instructions to the different sub-components of the beverage mixing appliance 102 for preparing the beverage in accordance with the details provided by the user through the use interface 172. The user interface 172 may be enabled through a set of Application Programming Interfaces (APIs).

For example, an API may allow an application of a smart phone to take information from a user that is used to populate appropriate modules of the appliance to enable remote specification of a beverage and other remote control features. The remote appliance management host system 104 may further include a data store 182 that serves as a repository of data for use in preparing a customized beverage. For example, the data store 182 may store pre-programmed recipes of beverages which may selectably ordered by a user through the user interface 172 sitting at a remote location from the beverage mixing appliance 102. In another example, the data store 182 may store user preferences, user details, and user historical orders for automatically providing an interface to a user next time he comes in to purchase a beverage so that he may use preset options for ordering a beverage based on his past orders and/or past preferences as identified through the information contained in the data store 182.

The remote appliance management host system 104 and/or beverage mixing appliance 102 may communicate with a supply chain management system 184 that may handle tracking of the need to replenish one or more containers, cartridges, or chambers. The supply chain management system 184 may route replenishment information to one or more replenishment stores, warehouses and/or vehicles such as delivery trucks, etc. The direct communication of the supply chain management system 184 with the remote appliance management host system 104 and/or the beverage mixing appliance 102 may allow 'just in time' delivery of various ingredients to the respective chambers, containers, cartridges, and bins of the beverage mixing appliance 102. The supply chain management system 184 may include various delivery channels and delivery mediums with intelligent systems and sensors that each may be connected directly with the remote appliance management host system 104 and/or the beverage mixing appliance 102 to receive and send information signals for replenishment of materials. The integrated supply chain management with the appliance 102 and the host system 104 may benefit and provide value to each entity involved in the supply chain and for providing an efficient channel management for on-demand replenishment of materials in real-time.

The remote appliance management host system 104 and/or beverage mixing appliance 102 may communicate with an analysis and reporting system 188 for analyzing data received from various data sources such as the data store 182, external data sources 190, data sources of the appliance 102, data received from the sub-systems of the appliance 102 and for generating reports from the analyzed data. The analyzed data and reports may be stored in the data store 182 and/or the external data sources 190 or may be sent to the beverage mixing appliance 102 for use in preparation of beverages. The analyzed data and the reports may be indicative of user preferences, user demographic details, replenishment information, supply management information, internal constraints, and operational factors of the appliance 102, user feedback, and user likes and dislikes, and the like. The analytics and reporting system 188 may enable various analyses and perform various reporting and other functions that may be enabled through analytics, reporting and other hosted applications. In an example, the analytics and reporting system 188 may optionally include an application for handling dynamic pricing, such as to influence use of components in a defined manner. For example, the dynamic pricing plan may promote consumption of ingredients in full containers by providing additional discounts, etc., and may seek to slow consumption of nearly empty containers or components by price increases.

The remote appliance management host system 104 and/or beverage mixing appliance 102 may communicate with a data storage system or the external data sources 190, and other external systems 108, and the like. The remote appliance management host system 104 may retrieve data from the external data sources 190 or may populate the external data sources 190 with reports or other information from the appliance 102 and/or the host system 104.

The remote appliance management host system 104 may include a networking facility 192 for allowing communication and networking through wired and/or wireless channels among the various components of the remote appliance management host system 104 and the appliance 102. In an example, the different components within the appliance 102 may be coupled communicatively as well as operatively. The networking facility 162 within the appliance 102 may allow such communication and networking within the appliance 102 to provide a communicative connection while different sub-components may be coupled operatively through delivery facilities such as tubes for passing ingredients from one sub-system to another. For example, a delivery facility 194 connects the water system 110 operatively to the mixing system 120, a delivery facility 198 connects the gas system 112 operatively to the mixing system 120, and a delivery facility 200 connects the flavoring pod system operatively to the mixing system 120. Similarly various other delivery facilities may be provided to connect other systems and sub-systems operatively within the appliance 102.

In an example, the beverage mixing appliance 102 may provide the user a customizable option for ordering a beverage according to specific individual requirements and taste. For example, the appliance may provide the user with alerts, such as signal to re-supply components. The appliance 102 may report calorie information and other information to the user through an interface such as a user interface screen similar to the user interface 172. In an example, the user interface may be a touch screen. The touch screen may allow a user to dial up and down various components, such as to provide a mixed-flavor beverage and/or a beverage with a desired level of sweetness or calorie level. The beverage mixing appliance 102 may facilitate a smart beverage preparation mechanism and system for allowing a user to intelligently vary taste, flavor, and various other characteristics of the beverage just by using from the provided selectable options presented on the user interface either at the local control unit 138 or at the remotely located user interface 172.

In an example, the beverage mixing appliance 102 may be an intelligent networked soda appliance. The intelligent networked soda appliance 102 may include a soda pod system which may represent "deconstructed" versions of conventional soda pods, such as by separating fluids, such as having a separate sweetener container, which may be held in the refrigeration system 158 of the intelligent networked soda appliance 102. This may enable better carbonation, due to lower temperature maintained in the refrigeration system 158. This may allow to easily meeting high quality standards that normally apply to packaged soda drinks (such as in cans or bottles). This may also enable 'dial your sweetness' control to a user to get sweetness according to individual preference. This may also allow the user to choose sweetener of his choice. For example, a user may select high fructose corn syrup or cane sugar or organic sugar, and the like. By taking the sugar out from the liquid, the containers are left with pod ingredients with a very narrow range of viscosity, which may aid in preparing a quality beverage or soda or any other drink. It may be noted that a pod that omits sugar can be significantly smaller, less expensive, and more environmentally acceptable than a pod with sugar. Such a pod may contain flavors, colors, acid, some amount of water and perhaps a buffer (which could be a small amount of liquid sugar or high fructose corn syrup). Further, omission of sugar may allow better pod emptying in an air or through water/liquid pressurizing system.

In a non-deconstructed pod-based appliance, the appliance 102 may have an algorithm which may alter pressure, which may force out the syrup based on viscosity (which in turn depends on temperature) as characterized for every pod or container, wherein every pod or container may be identified through an identification code by the appliance 102 to know intelligently which pod or container to which to apply the pressure. Also, viscosity will tend to be affected by the temperature of the syrup, which may also be measured by a sensor or sensors, so that a precise understanding of the viscosity of the in-pod syrup can be characterized, and an appropriate pressure applied. Also an algorithm may be used to take a surface temperature reading and extrapolate an average syrup temperature for the rest of a unit of syrup.

The respective rates of ingredient evacuation may be an important factor in controlling the mixing of ingredients and achieving a "trademark." or high level of quality control of the ratios of ingredients throughout a finished beverage. This is particularly challenging with ingredients that have high and variable viscosities, such as syrup and particularly liquid sugar or high fructose corn syrup. Two technical solutions may be used, as alternative or in combination, to address this challenge. The first is to utilize a pumping system that is not highly dependent on viscosity, such as a volumetric pumping system that evacuates the ingredient at a given rate independent of viscosity (i.e., force). In the second method, referred to as a pressure system or a forced system, the viscosity of the ingredient is identified (by understanding the syrup/brand and temperature) and the system adjusts the force given the viscosity. In such an embodiment a sealed environment may be created, and the space may be pressurized with air, CO2, nitrogen, or the like. Based on an understanding of the viscosity of the fluid being evacuated (which may include characterizing the specific brand (and its inherent viscosity curves) and the temperature of the syrup), an appropriate amount of gas pressure can be regulated in the sealed chamber to achieve the desired exit flow rate. A control system can be leveraged to manage the exit gas pressure during the pour to ensure optimal, "trademark," results.

The sugar systems mentioned above have a viscosity that varies with temperature and brand, so both aspects may be understood and characterized. So, for an overpressure system it may be useful to understand and characterize both the specific brand of product and the average temperature of the viscous ingredient. The brand of the product may be identified on the pod, such as with a colored label, and a sensor, such as an optical sensor, can discern color. Another solution may be a simple binary code on the container, an RFID tag, a QR code, a bar code, or the like. The temperature of the ingredient can be measured, such as with a thermal sensor, e.g. a thermistor. Also temperature-affected, color changing packaging can utilize an optical sensor to detect a brand signature.

Other methods of evacuating a viscous fluid can include using pulse width modulation (PWM) with a micro-controlled solenoid. In embodiments, one may use various techniques to evacuate the pod in a predictable way; for example, the pod may be evacuated volumetrically, using a stepper motor to apply pressure to the pod in a linearly correlated rate to the effluence of water. This may involve using a pod that has a disk to which pressure is applied and a syrup container that is collapsible, such as a plastic pouch or a plastic container that can collapse predictably. Further, the forcing mechanism to evacuate a pod may be the water for the beverage itself, either pre-carbonated or post carbonated. Again, a solid disk may be used to receive the force and to push the syrup out of the flexible pod. In embodiments, the syrup in the pod may consist of a pouch full of syrup, an attached plastic disk, an outer plastic pod body, and one or more seals on the top and/or bottom of the pod assembly. A seal (e.g., the lower seal) may be punctured and the pressure applied to appropriately move the disk and drive the syrup out of the pouch. This may be accomplished by using variable forces, such as noted above, such as based on understanding the fluid viscosity as previously described.

Once the beverage ingredients are customized based on user preferences, stored programmed instructions and other information as obtained from the user locally or through the host system 104 located at a remote location, the beverage can be prepared and delivered to the user through the beverage delivery system 122. The beverage delivery system may include dispensing machines and apparatuses for allowing a user to receive the beverage directly. The beverage delivery system may be coupled to an intelligent sensor 202 for controlling flow of beverage to the dispensing system based on amount paid by the user or based on user input received earlier, and various other inputs as suggested either by the user or by the remote host system 104. The mixing system 120 may supply the ingredients after mixing to the dispensing or beverage delivery system 122 through a delivery facility 204. Among other things, the appliance 102. In accordance with the present disclosure may provide a quality dispensed cold CSD beverage with clean water, cold temperature, high carbonation and good ratio control.

A waste disposal system 218 may include one or more sensors for reporting data to the control system 168 and may handle waste water (e.g., from melted, unused ice) and other ingredients (such as unused portions). The waste disposal system may recycle one or more ingredients, such as to a filter, for re-use.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be a frequency division multiple access (FDMA) network or a code division multiple access (CDMA) network. The cellular network may include mobile devices, cell sites, base stations, repeaters, antennas, towers, and the like. The cell network may be a GSM, GPRS, 3G, EVDO, mesh, or other network types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time, semiconductor storage known as random access memory (RAM); mass storage types typically used for more permanent storage, such as optical discs, forms of magnetic storage like hard disks, tapes, drums, cards and other types; processor registers, cache memory, volatile memory, non-volatile memory, optical storage such as CD, DVD; removable media such as flash memory (e.g. USB sticks or keys), floppy disks, magnetic tape, paper tape, punch cards, standalone RAM disks, Zip drives, removable mass storage, off-line, storage area networks, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. Alt methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. An appliance for mixing and delivery of one or more beverages to a user, comprising:
   a gas handling system for accepting a gas cartridge, the gas cartridge for providing at least one carbonating gas;
   a flavoring system for retaining at least one flavoring unit, the at least one flavoring unit for providing at least one flavoring to at least one beverage;

a water system for containing water, the water system configured for selectably generating carbonated water from the water and the at least one carbonating gas;

a cooling system for containing ice, the ice comprised of frozen water, at least one of the cooling system or the ice for cooling at least one of the water or the carbonated water;

at least one temperature sensor operably coupled with at least one of the cooling system or the water system, the at least one temperature sensor configured to generate temperature data associated with one or more of the water or the carbonated water; and a controller operably coupled to at least one of the cooling system or the water system, the controller configured to receive the temperature data from the at least one temperature sensor and determine an ice melt factor associated with bringing at least one of the water or the carbonated water to a desired temperature using the ice of the cooling system, the ice melt factor yielding a first amount of water available for a given carbonated beverage, the controller configured to account for the ice melt factor to determine an additional amount of the water needed to constitute the given carbonated beverage.

2. The appliance of claim 1, wherein the gas handling system is adapted to accept carbon dioxide ($CO_2$) cartridges that are sized at or below 88 grams.

3. The appliance of claim 1, further comprising an ice making system configured for at least one of generating the ice or cooling the at least one of the water or the carbonated water.

4. The appliance of claim 1, further comprising a user interface by which a user is able to specify at least one of a desired flavor, a desired level of sweetness, a desired temperature, or a desired type of a sweetener.

5. The appliance of claim 1, further comprising a mixing system for mixing one or more of the at least one beverage ingredient or component thereof, the at least one flavoring, the at least one gas, the water, or the carbonated water to produce the at least one beverage.

6. The appliance of claim 5, wherein the mixing system uses at least one additional sensor to sense at least one of a level, a flow, a pressure, or a temperature of one or more of the at least one of a beverage ingredient or component thereof, the at least one flavoring, the at least one gas, the water, or the carbonated water.

7. The appliance of claim 1, wherein the flavoring system comprises at least one of a pod, pouch, or a cartridge system.

8. The appliance of claim 1, wherein the flavoring system is a volumetric syrup delivery system that is not dependent on viscosity.

9. The appliance of claim 1, wherein the appliance generates an ice bank to provide capacitive cooling capability for one or more of the at least one of a beverage ingredient or component thereof, the at least one flavoring, the water, or the carbonated water, for generating the at least one carbonated beverage.

10. A networked appliance for mixing and delivery of one or more beverages to a user, comprising:

a gas handling system for accepting a gas cartridge, the gas cartridge for providing at least one carbonating gas;

a flavoring system for retaining at least one flavoring unit, the flavoring unit for providing at least one flavoring for at least one beverage;

a water system for containing water, the water system configured for selectably generating carbonated water from the water and the at least one carbonating gas;

a cooling system for containing ice, the ice comprising frozen water, at least one of cooling system or the ice for cooling at least one of the water or the carbonated water;

at least one temperature sensor communicatively coupled with at least one of the cooling system or the water system, the at least one temperature sensor configured to generate temperature data associated with at least one of the water or the carbonated water; and a communications facility for connecting the appliance to a remote host system, the communications facility configured to deliver sensed temperature data to the remote host, wherein the remote host is configured to receive the sensed temperature data and determine an ice melt factor associated with bringing at least one of the water or the carbonated water to a desired temperature using the ice of the cooling system, the ice melt factor yielding a first amount of water available for a given carbonated beverage, the controller configured to account for the ice melt factor to determine an additional amount of the water needed to constitute the given carbonated beverage.

11. The appliance of claim 1, wherein the beverage ingredient or component thereof comprises at least one of a syrup or a component thereof.

12. The appliance of claim 1, wherein the ice comprises ice produced externally from the appliance and added by a user.

13. The appliance of claim 1, wherein the cooling system is configured to subsequently add an amount of the ice as an ingredient to the at least one carbonated beverage.

14. The appliance of claim 10, further comprising a mixing system for mixing one or more of the at least one beverage ingredient or component thereof, the at least one flavoring, the at least one gas, the water, or the carbonated water to produce the at least one beverage.

15. The appliance of claim 14, wherein the mixing system uses at least one additional sensor to sense at least one of a level, a flow, a pressure, or a temperature of one or more of the at least one of a beverage ingredient or component thereof, the at least one flavoring, the at least one gas, the water, or the carbonated water.

16. The appliance of claim 10, further comprising at least one additional sensor configured to sense at least one of a pressure level or a remaining level of one or more of the at least one beverage ingredient or component thereof, the at least one flavoring, or the at least one gas.

17. The appliance of claim 10, further comprising a user interface by which a user is able to specify at least one of a desired flavor, a desired level of sweetness, a desired temperature, or a desired type of a sweetener.

18. The appliance of claim 10, wherein the ice comprises ice produced externally from the appliance and added by a user.

19. The appliance of claim 10, wherein the cooling system is configured to subsequently add an amount of the ice as an ingredient to the at least one beverage.

* * * * *